United States Patent [19]

Robin et al.

[11] Patent Number: 4,892,248
[45] Date of Patent: Jan. 9, 1990

[54] HEATING INSTALLATION COMPRISING A HEAT GENERATOR, INTENDED FOR AN AUTOMOBILE

[75] Inventors: Roger Robin, Elancourt; Jean-Francois Somme, Chaville; Jean-Francois Bouvot, Dampierre, all of France

[73] Assignee: Valeo, Paris, France

[21] Appl. No.: 196,466

[22] Filed: May 20, 1988

[30] Foreign Application Priority Data

May 21, 1987 [FR] France .................. 87 07158

[51] Int. Cl.⁴ .................................................. B60H 1/02
[52] U.S. Cl. ........................ 237/12.3 B; 237/12.3 C; 237/2 A
[58] Field of Search .............. 237/12.3 R, 12.3 A, 237/12.3 B, 12.3 C, 2 A

[56] References Cited

U.S. PATENT DOCUMENTS

| 3,758,031 | 9/1973 | Moran | 237/12.3 C X |
| 4,394,960 | 7/1983 | Nakazawa | 237/12.3 C |
| 4,562,890 | 1/1986 | Matoba | 237/12.3 R X |

FOREIGN PATENT DOCUMENTS

1076361 10/1954 France ............................ 237/12.3 B

*Primary Examiner*—Henry A. Bennet
*Attorney, Agent, or Firm*—Dennison, Meserole, Pollack & Scheiner

[57] ABSTRACT

A heating system for an automobile comprising a circulation circuit for the coolant fluid of the engine of the vehicle, including a primary heating circuit connected to the engine and a secondary heating circuit including a heat exchanger positioned to heat the air to be transmitted into the passenger area of the vehicle and a heat generator separated from the primary heating circuit to accelerate the increase of the temperature of the fluid in the heat exchanger.

13 Claims, 5 Drawing Sheets

FIG.1

PRIOR ART

HEATING INSTALLATION COMPRISING A HEAT GENERATOR, INTENDED FOR AN AUTOMOBILE

The invention concerns a heating system including a supplemental heat generator intended for use in an automobile.

Passenger heating installations for automobile are already known in which the heat from the coolant fluid of the engine circulates in closed circuit, is heated by the thermal energy generated by operation of the engine, and is used directly for heating the passenger compartment of the automobile.

The coolant fluid circulation circuit in existing systems utilizes a heat exchanger serving as cooling radiator for the engine and another heat exchanger serving as heating radiator for the passenger compartment.

The cooling radiator is intended to be a part of a system through which fresh air passes to cool the engine coolant. Traditionally, a thermostatic control valve is provided so that the coolant may not pass through the cooling radiator until the temperature of this fluid rises above a certain threshold. Below this threshold, the coolant fluid passes through a diversion conduit and bypasses the cooling radiator.

The passenger compartment heating radiator is intended to have fresh air passing through it in order to warm the ambient air and then direct it to the interior of the passenger area of the vehicle. This heating radiator thus benefits from the thermal losses from the engine.

In order that the heating installation can operate efficiently, it is necessary that the coolant fluid of the engine be sufficiently heated to release heat to the air which passes through the heating radiator.

Under certain circumstances, a prolonged period may be required to realize sufficient heat for use during cold weather and particularly in the course of the initial operation of the engine. Incrementally more time is required if large engines and coolant capacities are employed and in extreme conditions, it may be impossible to achieve full heating capacity, such as under conditions existing with high performance engines of the adiabatic type.

This problem has a tendency to increase with modern engines which operate under optimum conditions and of which the calorific losses are reduced as far as possible.

To attempt to remedy this situation, it has been proposed to mount a heat generator in the coolant fluid circuit which is intended to furnish additional heat to the passenger area of the vehicle and/or to maintain a sufficient operational temperature for the engine even when engine speeds are low.

Appropriate heat generators have been described, for example in French patent application Nos. 85 11 596; 85 11 597; 85 11 598; 85 19 286; and 86 01 456 in the name of this applicant.

In the heating installations of this type, the heat generator is intended to furnish supplemental heat to the coolant fluid of the engine to facilitate the rise of the temperature of this fluid and, consequently, the temperature of the fresh air to be introduced into the passenger area of the vehicle.

However, these known installations present another deficiency in the sense that the heat produced by the supplemental heat generator serves, for the most part, to heat the total volume of the cooling liquid and thus to heat the mass of the engine, in other words, to heat an entirety which represents a large thermal inertia.

Under these conditions, and as long as the temperature of this entirety has not reached a certain threshold, only a part of the heat produced by the generator is introduced into the heating radiator, and that occurs during a time which becomes progressively longer as the mass to be heated presents a higher thermal inertia.

This invention is particularly intended to avoid the drawbacks of the heating installations of the prior art.

For this purpose, the invention proposes a heating system for an automobile, comprising a circulation circuit for the coolant fluid of the vehicle engine. This circuit includes a heat exchanger with the coolant fluid passing through it and is intended to heat the air to be transmitted into the passenger area of the vehicle, as well as a heat generator connected with the operation of the engine of the vehicle and designed to raise the temperature of the coolant liquid in the circuit.

Accordingly, one important feature of the invention is the inclusion of one primary heating circuit connected to the engine with coolant fluid circulating through it continuously and a secondary heating circuit which includes a secondary heat exchanger and a heat generator isolated from the primary heating circuit in order to accelerate the rise of the temperature of the fluid in the secondary heat exchanger.

The secondary heat exchanger serving as heating radiator and the heat generator are thus mounted in a secondary heating circuit which can be selectively isolated from the primary heating circuit and which consequently possesses a low thermal inertia. Because of this, the rise in temperature of the fluid in the secondary heating circuit is effected much more rapidly than in the rest of the circuit of coolant fluid circulation and particularly in the primary heating portion of this circuit.

In one embodiment of the invention, the secondary heating circuit is connected to the primary heating circuit by means of a two position valve. In a first position, the secondary heating circuit is isolated from the primary heating circuit and in a second position, the secondary heating circuit is in communication with the primary heating circuit and receives fluid therefrom.

In this first embodiment, the secondary heating circuit is connected to the primary heating circuit solely by the aforementioned valve. The valve is mounted between the primary heating circuit and the secondary heating circuit so that when the valve is in the second position, the fluid circulates successively in a part of the primary heating circuit, through the valve, into the entire secondary heating circuit, back through the valve, and then through the remainder of the primary heating circuit.

When the aforementioned valve is in the first position, the secondary heating circuit has a low thermal inertia independent circuit in which the increase of the temperature of the fluid takes place very rapidly.

When the aforementioned valve is in the second position, the secondary heating circuit is supplied through the primary heating circuit and, consequently, the secondary heat exchanger which serves to heat the air of the passenger area then benefits from the thermal power of the engine.

In a second embodiment of the invention, in which the secondary heating circuit is also connected to the primary heating circuit by means of a two position valve, as indicated in the first embodiment, a primary heat exchanger is provided in the primary heating circuit.

The primary heat exchanger of the primary heating circuit is situated upstream from the secondary heat exchanger of the secondary heating circuit in relation to the flow of the air to be heated. Thus, air passes successively through the primary heat exchanger of the primary heating circuit before passing through the secondary heat exchanger of the secondary heating circuit.

Accordingly, air passing through the heat exchanger of the secondary heating circuit has already been preheated by the primary heat exchanger of the primary heating circuit which allows for the rise in the temperature of the hot air introduced into the passenger area.

Preferably, upstream from the primary heat exchanger, the primary heating circuit includes a diversion conduit which supplies the two position valve, this valve then communicating with the secondary heating circuit and upstream from the heat exchanger of this circuit. Thus, when the valve is in its first position, the fluid circulating in the primary heating circuit feeds only the heat exchanger of the primary circuit, and when the valve is in its second position, the fluid circulating in the primary heating circuit supplies both the heat exchanger of the primary heating circuit and the heat exchanger of the secondary heating circuit, and performs this circulation by means of the diversion conduit.

In a variation of the first embodiment, the heat exchanger of the primary heating circuit and the heat exchanger of the secondary heating circuit open downstream into a single conduit which is common to both the primary and secondary heating circuits.

In still another variation, the heat exchanger of the primary heating circuit and the heat exchanger of the secondary heating circuit open downstream into two different discharge conduits which are parts respectively of the primary heating circuit and the secondary heating circuit and which are connected together by a connection conduit, which may be provided with a valve which will selectively permit communication therebetween.

In a third embodiment of the invention, the primary heating circuit and the secondary heating circuit are permanently isolated from each other and a heat exchanger is also provided in the primary heating circuit of the third embodiment.

In conformance with another feature of the invention, a fluid expansion device connects the secondary heating circuit to the primary heating circuit, the fluid circulation in the primary heating circuit and in the secondary heating circuit still being accomplished with the circuits isolated from each other. Also, a device can be provided separate from the circuit which is either an expansion vessel attached to the circuit, or the heat generator itself includes an expansion device.

In yet another embodiment, the heat exchanger of the primary heating circuit and the heat exchanger of the secondary heating circuit are connected in side-by-side relationship, or form part of an assembly of multiple heat exchangers formed in one piece.

In another embodiment, the heat exchanger of the primary heating circuit and the heat exchanger of the secondary heating circuit are physically separated but in spaced relation to each other.

BRIEF DESCRIPTION OF THE DRAWINGS

In the following description, provided solely as an example, reference is made to the attached drawings.

DESCRIPTION OF THE PREFERRED EMBODIMENTS

Figure 1:
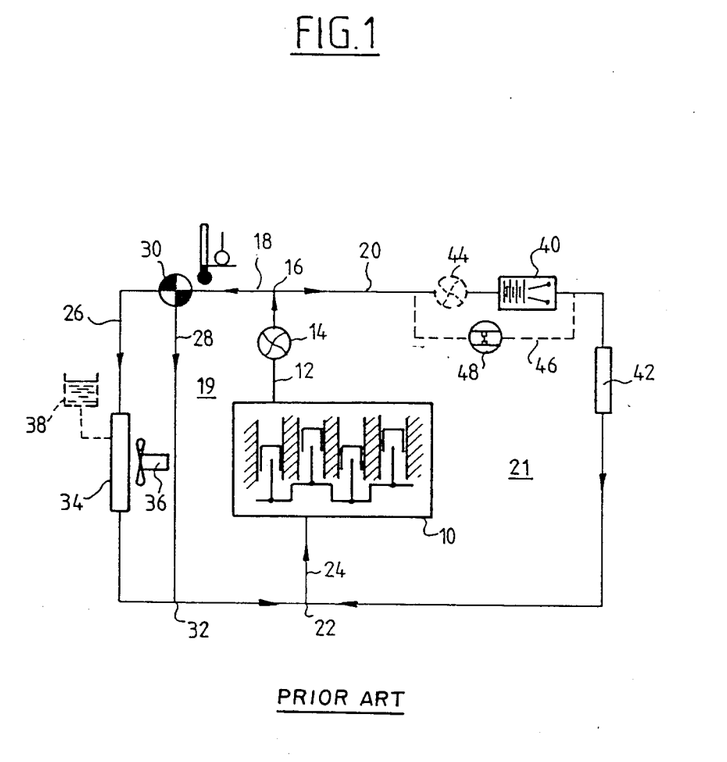
FIG. 1 shows a diagrammatic representation of a heating installation for an automobile in accordance with the prior art.

The heating installation according to the prior art, as shown in FIG. 1, uses the heat generated by the operation of an internal combustion engine 10 of an automobile. A discharge conduit 12 is attached at the discharge from the engine, and a coolant circulation pump 14 is mounted on conduit 12. The conduit 12 is connected at 16 to two branches 18 and 20 which are reconnected at a point 22 to an inlet conduit 24, in turn connected to the inlet of engine 10. The assembly formed by conduit 12, branches 18 and 20, and conduit 24 constitutes a circulation circuit for the engine coolant, a fluid which may for instance be constituted of a mixture of water and glycol, and circulating in the direction indicated by the arrows, under the effect of coolant pump 14.

Branch 18 or the "cooling branch" is divided into two conduits 26 and 28 of which the inlets are controlled by a thermostatic control valve 30 and of which the discharge outlets are connected at a point 32 of branch 18. An engine heat exchanger 34 is mounted in series with branch 26 and there serves as cooling radiator with which is associated a motor-powered fan 36, this radiator optionally also including an expansion vessel 38. The assembly which is thus formed constitutes the "cooling circuit" 19.

On branch 20, or the "heating branch", is mounted a heat exchanger 42 which serves as heating radiator to heat the fresh air brought in from outside the passenger area of the vehicle and to introduce the heated air into the interior of this passenger area. The assembly which is thus formed constitutes the "secondary heating circuit" 21. It is on this circuit that a heat generator 40 is mounted which can be situated either upstream from or downstream from heat exchanger 42 in relation to the direction of circulation of the fluid in circuit 21, in this case, upstream. Optionally, as is shown in broken line in FIG. 1, a circulating pump 44 can be provided immediately either upstream or downstream from heat generator 40. In addition, it is optionally possible to provide a diversion or "by-pass" circuit 46 comprising a calibrated orifice 48, in such a manner as to allow fluid to pass through this diversion conduit in the case wherein the loss of charge while passing through heat generator 40 would become too high.

The installation shown in FIG. 1 operates in the following manner:

After the cold engine has been started up, the coolant of the engine circulates, under the effect of pump 14 and, if present, of the optional pump 44, in the cooling circuit in the direction indicated by the arrows. In a first phase of the operation, in which the temperature of the coolant is below a certain predetermined threshold temperature, the valve 30 is in a position so that the fluid circulating in branch 18 passes only through conduit 28, without passing through conduit 26 and heat exchanger 34, and that occurs in such a manner as to favor the rise of the temperature of the engine and the coolant. In the course of this same operational phase, heat generator 40 operates so as to assure a contribution of heat to the coolant fluid circulating through the entire circuit.

When the temperature of the coolant reaches the aforementioned threshold, valve 30 takes a second position in which the access to conduit 28 is closed and the access to conduit 26 is open. In this second operational phase, the coolant circulating in branch 18 then passes only through conduit 26 and heat exchanger 34, without passing through diversion conduit 28. In this second operational phase, heat generator 40 is deactivated since the fluid has reached a sufficiently high temperature to assure the heating of the air by heat exchanger 42.

As indicated heretofore, this known installation has the particular drawback that heat generator 40, when it is in operation, assures the heating of the entire volume of coolant fluid and also the heating of the engine. In other words, an assembly presenting a high overall thermal inertia. Because of this fact, heat exchanger 42 benefits only from a part of the heat produced by generator 40.

The invention is intended to avoid such an inconvenience by proposing a heating installation of the aforementioned type in which the heat generated by the heat generator is recovered integrally, within the system, by the secondary heat exchanger which serves to heat the air to be transmitted into the passenger area of the vehicle.

In the installation according to the invention, which will now be described in reference to FIGS. 2 to 8, certain elements are known in common with the installation of the prior art which has just been described with reference to FIG. 1. These common elements which concern essentially the engine and the coolant circuit are identified by the same reference numerals.

Figure 2:
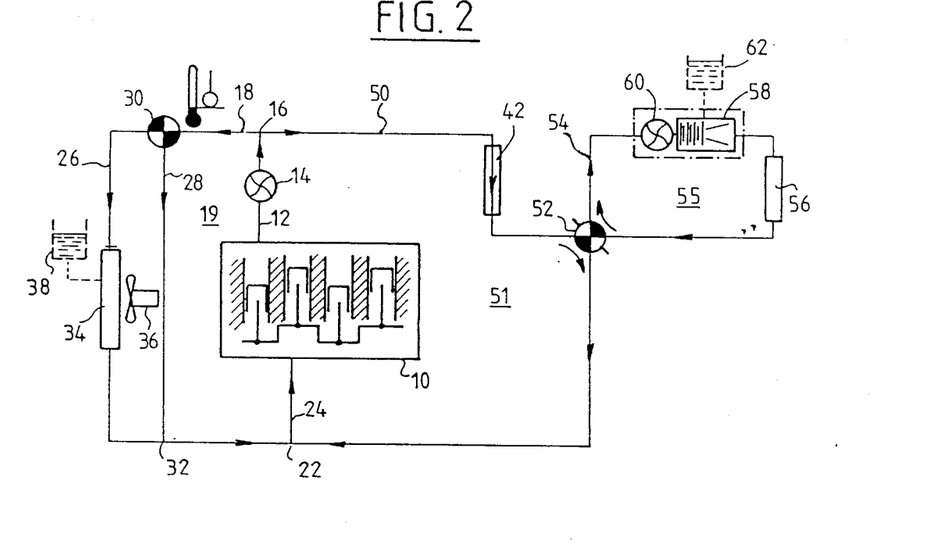
FIG. 2 shows a diagrammatic representation of a heating installation for an automobile according to a first embodiment of the invention and in a first phase of operation.
Figure 3:
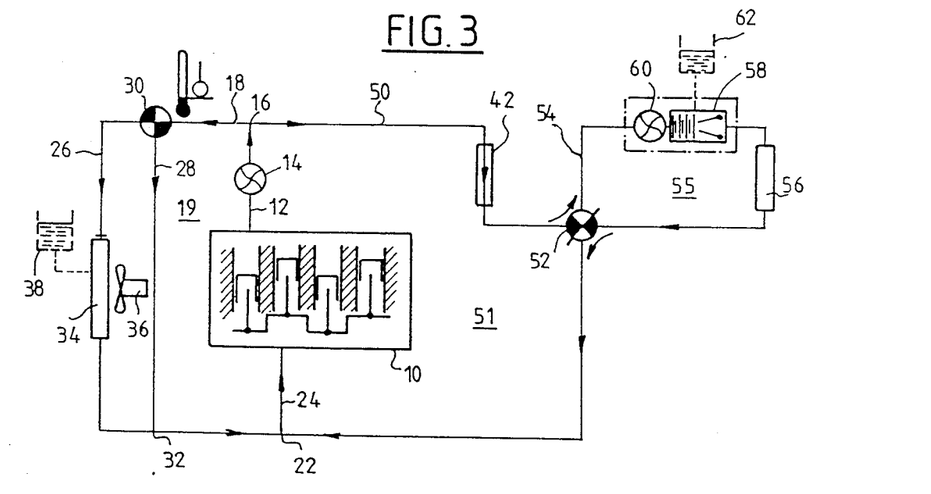
FIG. 3 shows a diagrammatic representation of the heating installation of FIG. 2 in a second phase of operation.

Referring now to FIGS. 2 and 3, in these embodiments, the part of the circuit of the coolant which is effected during the heating of the passenger area comprises one circulation branch 50 which is connected to engine 10, the inlet of branch 50 being connected to the attachment point 16 and its outlet being connected to attachment point 22. Branch 50 has the coolant running through it continuously when engine 10 and water pump 14 are in operation. It is on this circulation branch 50 that a heat exchanger 42 is mounted in this embodiment. The entire assembly which is thus formed constitutes the primary heating circuit 51.

Circuit 51 is connected through a four-way valve 52 to a circulation branch 54 on which are mounted a heat exchanger 56 configured to heat the air to be directed into the passenger area of the automobile. A heat generator 58, a pump 60 mounted either upstream or downstream from generator 58, and this generator may also be situated either upstream or downstream from exchanger 56, in relation to the direction of the fluid circulation, as shown by the arrows, constitutes the secondary heating circuit 55. Circuit 55 can optionally include its own expansion vessel 62, as shown with the broken line, or an expansion device for the fluid such as, for instance, a calibrated orifice in valve 52, allowing a minimum flow of the fluid between circuit 51 and circuit 55 during the expansion of the fluid in the circuits.

Valve 52 is a two position valve. In the first position (FIG. 2), circuit 55 is isolated from circuit 51 and in the second position (FIG. 3), circuit 55 is in communication with circuit 51 and is being supplied fluid through circuit 51.

In the embodiment shown in FIGS. 2 and 3, circuit 55 is connected to circuit 51 solely through valve 52, and valve 52 is mounted between circuits 51 and 55.

When the valve is in the position which is illustrated in FIG. 2, the circulation of the fluid in circuit 55 is totally independent of the circulation of the fluid in circuit 51.

When valve 52 is in the position illustrated in FIG. 3, the fluid circulates successively in a first part of circuit 51 which is located between point 16 and valve 52, through valve 52, through the entire circuit 55, once again through valve 52, and then through the second part of circuit 51 which extends between valve 52 and the connection 22.

When valve 52 is in the position illustrated in FIG. 2, the increase of the temperature of the coolant fluid which circulates in circuit 55 and, consequently, in heat exchanger 56 is accomplished much more rapidly than the increase of the temperature of the coolant fluid which circulates in all of the rest of the circuit and particularly in circuit 51.

A control logic (not shown) may be provided in order to operate the valve 52 as a function of the temperature of the fluid. It is here to be noted that the control logic controlling valve 52 is not necessarily combined with that of the thermostatic control valve 30 because it is recognized that it can be important to move valve 52 from the position of FIG. 2 to the position of FIG. 3 independently of thermostatic control valve 30, for instance, if this valve 30 is in a position such that the coolant passes through diversion branch 28.

Also, it can be provided that exchanger 42 may be deleted from the primary heating circuit when the heat produced by the heat generator 58 is sufficient to heat the passenger area.

Figure 4:
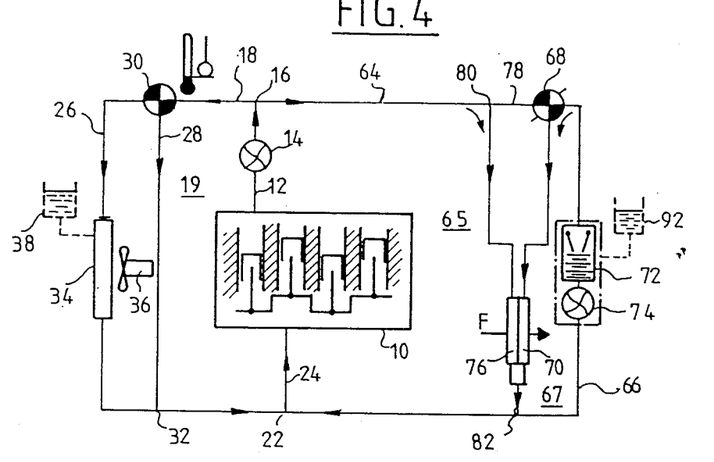
FIG. 4 shows a diagrammatic representation of a heating installation for an automobile, in accordance with a second embodiment of the invention and in a first phase of operation.
Figure 5:
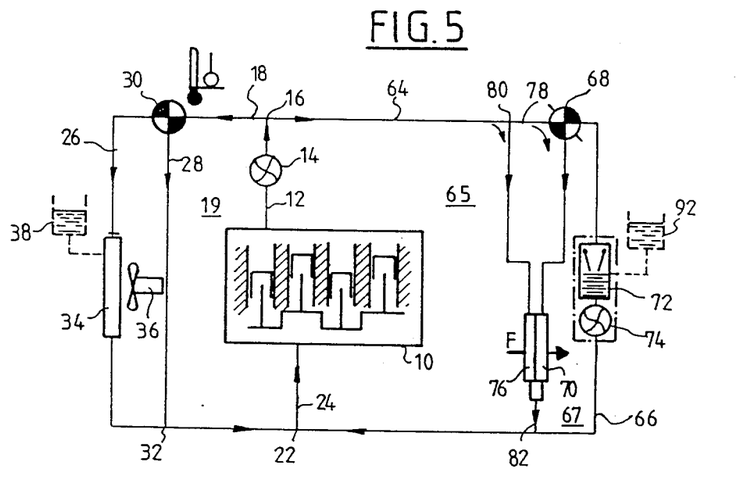
FIG. 5 shows a diagrammatic representation of the heating installation of FIG. 4 in a second phase of operation.

Considering now FIGS. 4 and 5, in these embodiments, the part of the circuit being effected by the heating of the passenger area of the automobile also comprises a primary heating circuit 65 connected to engine 10 and with the coolant fluid passing therethrough continuously and a secondary heating circuit 67 configured to be isolated from circuit 65. Circuit 65 includes a circulation branch 64 connected at its inlet to connection 16 and at its outlet to connection 22.

Circuit 67 includes a circulation branch 66 connected to circuit 65 through a valve 68, and a heat exchanger 70 which serves to heat the passenger area of the automobile, as well as a heat generator 72 with which is associated a pump 74. As shown in FIGS. 4 and 5, heat exchanger 70 is situated downstream from valve 68 and upstream from heat generator 72, in relation to the direction of circulation of the fluid in circuit 66 as indicated by the arrows.

In the embodiment shown in FIGS. 4 and 5, a heat exchanger 76 is also provided in primary heating circuit 65. Heat exchanger 76 is situated immediately upstream from heat exchanger 70 in relation to the flow of the air to be heated, with this air flow passing successively through heat exchanger 76 and heat exchanger 70 as shown by the arrow F. Exchangers 76 and 70 can be constituted of two exchangers which are aligned side by side tightly against one another or by the two layers of one single exchanger.

Primary heating circuit 65, upstream from its heat exchanger 76, includes a diversion conduit 78 which feeds valve 68. The inlet of this conduit 78 is connected to branch 64 and its outlet is connected to valve 68. Valve 68 is mounted in series with conduit 78 in circuit 67 and upstream from heat exchanger 70.

Heat exchangers 70 and 76 open downstream into one single conduit 82 which is common to both branch 64 and circuit 67.

Valve 68 is a two position valve. In the first position (FIG. 4), circuit 67 is isolated from circuit 65 and in the second position (FIG. 5), circuit 67 is in communication with circuit 65 and is supplied fluid through circuit 65.

In the position shown in FIG. 4, the outlet of conduit 78 is closed by valve 68 and the fluid circulating in circuit 65 feeds only heat exchanger 76. In the position shown in FIG. 5, the outlet of conduit 78 is in communication with circuit 67. Consequently, the fluid circulating in circuit 65 feeds both heat exchanger 76 and heat exchanger 70. In this case, heat generator 72 and pump 74 are stopped. The fluid which then flows through conduit 82 returns to the engine 10.

Figure 6:
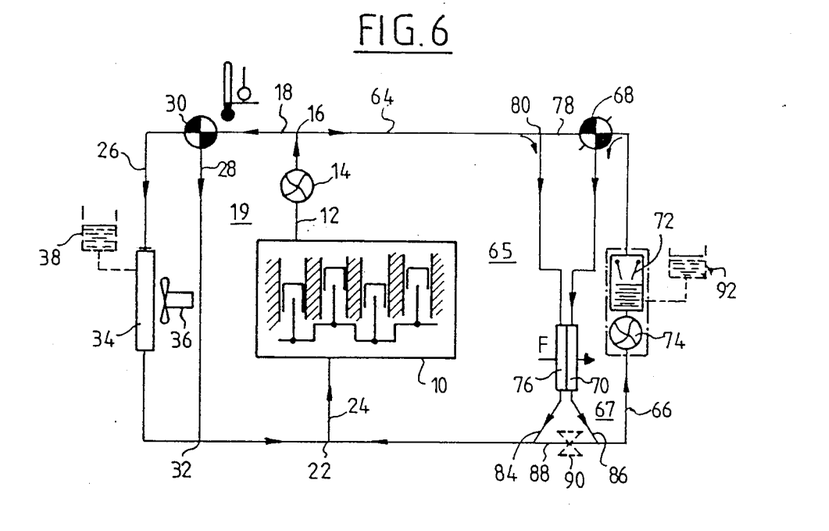
FIG. 6 shows a diagrammatic representation of another heating installation according to the invention in a modification of this second embodiment.

Reference is now made to FIG. 6 which constitutes a modification of the installation represented in FIG. 5. In this embodiment, heat exchanger 76 of circuit 65 and heat exchanger 70 of circuit 67 both open downstream into separate outlet conduits 84 and 86 which are respectively parts of circuit 65 and circuit 67. Conduits 84 and 86 are connected through a connecting conduit 88 thereby forming a triangular circuit, and conduit 88 thus assures the connection between circuit 66 and branch 64.

A two position valve 90 can be mounted on conduit 88 and is movable between open and closed positions. In the closed position, the conduit 84 and conduit 86 are isolated from each other; in the open position, conduit 84 and conduit 86 are in communication with each other through conduit 88.

Valve 90 is advantageously controlled synchronously with valve 68 in such a manner that these two valves can simultaneously either isolate or connect conduit 84 and 86.

The installation according to FIG. 6 operates in the same manner as that of FIGS. 4 and 5.

Figure 7:
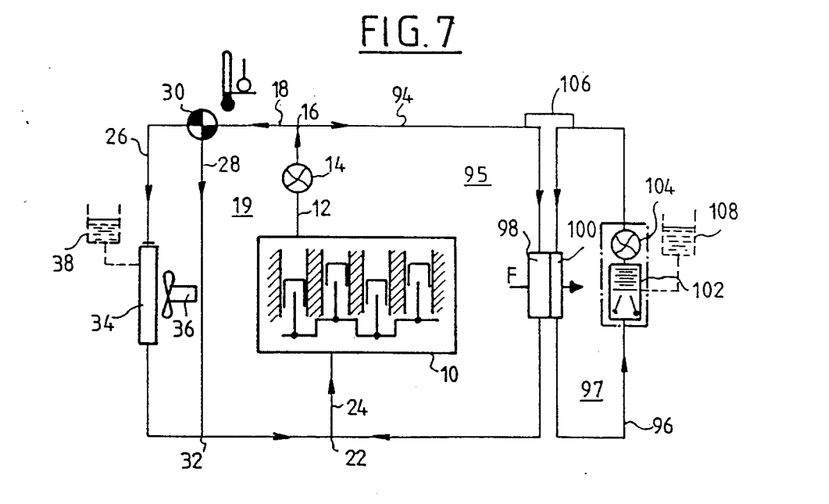
FIG. 7 shows a diagrammatic representation of a heating installation according to a third embodiment of the invention.

Reference is now to be made to FIG. 7. In this embodiment of the invention, the circuit of fluid circulation effected by the heating of the passenger area of the automobile also comprises a primary heating circuit 95 connected to engine 10 and with coolant fluid running therethrough continuously and a secondary heating circuit. Circuit 95 comprises a branch 94 connected at points 16 and 22 and also includes a heat exchanger 98. Circuit 97 further includes branch 96, heat exchanger 100, and a heat generator 102 to which is coupled a water pump 104. In this embodiment, circuits 95 and 97 are permanently isolated from one another. A conduit 106 for fluid expansion, however, is connected to circuit 95 and circuit 97. Alternatively, an expansion vessel 108 may be provided if said conduit 106 is deleted.

Heat exchanger 98 is of a sufficient capacity to assure the heating of the passenger area in customary conditions. Heat exchanger 98 is situated upstream from heat exchanger 100 in relation to the direction of circulation of the air to be heated, as is shown by the arrow F.

The installation of FIG. 7 includes a control logic circuit (not shown) which particularly assures the actuation of the heat generator 102. This heat generator is energized and remains in operation as long as the temperature of the coolant which passes through exchanger 98 is insufficient to heat the air to be transmitted into the passenger area. During this entire phase of operation, the air is preheated by heat exchanger 98 and is then heated by heat exchanger 100 which benefits from the heat which is communicated to it through heat generator 102. When the temperature of the fluid which circulates through exchanger 98 is sufficiently high to assure the heating of the air to be sent into the passenger area, generator 102 can then be deenergized.

Figure 8:
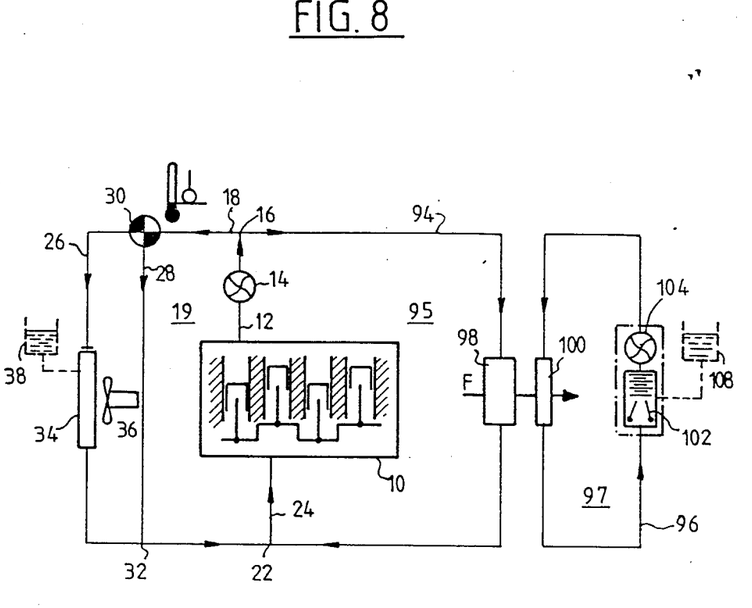
FIG. 8 shows a modification of embodiment of the installation shown in FIG. 7.

With reference now to FIG. 8, a modification of the embodiment of the installation of FIG. 7 is illustrated. In this modification, circuit 97 is totally disengaged from circuit 95. The two heat exchangers 98 and 100, instead of being aligned one against the other, as in the case of FIG. 7, are totally separated and can be situated at a certain distance from one another in order, for instance, to take into consideration the particular configuration of the automobile which is being served. The installation of FIG. 8 operates in the same manner as that of FIG. 7.

According to the invention, the heat generator used is a generator linked with the operation of the engine of the vehicle and which in particular can transform a part of the mechanical energy of the engine into heat, or else can directly recover the heat which is produced at the same time as this mechanical energy of the engine, or else can directly recover heat from the exhaust from the engine.

We claim:

1. A heating system for use in a vehicle comprising a coolant fluid circulation system including primary and secondary heating circuits, said primary circuit including a primary heat exchanger and the engine as a primary heat generator, said secondary heat circuit including a secondary heat exchanger positioned to heat the air to the passenger area of the vehicle, said secondary heat circuit further including a secondary heat generator responsive to the operation of said engine to raise the temperature of the coolant contained in said secondary heat exchanger, said primary and said secondary heating circuits being selectively connectable to and isolated from each other at engine start to accelerate the increase in the temperature of the coolant fluid in said secondary heat exchanger.

2. The heating system of claim 1 wherein the secondary heating circuit (55, 67) is selectively connected to the primary heating circuit through valve means (52, 68) movable between first and second positions to control the flow of coolant fluid in said system, said first position of said valve preventing interconnection between said primary heating circuit and said secondary heating circuit and said second position of said valve establishing communication between said primary and said secondary heating circuits.

3. The heating system of claim 2 wherein said valve means is mounted between said primary and secondary heating circuits and wherein when said valve is in said second position, coolant circulates in said system in a first portion of said primary heating circuit, through said valve, into and through said secondary heating circuit, and back into said primary heating circuit into a second portion of said primary heating circuit.

4. The heating system of claim 1 wherein said primary heat exchanger is positioned upstream from said secondary heat exchanger, and the air passing over said heat exchangers passes over said primary heat exchanger and then over said secondary heat exchanger.

5. The heating system of claim 4 wherein the primary circuit includes a diversion conduit connected to a valve mounted in series with said secondary heating circuit upstream of said secondary heat exchanger, said valve being movable between first and second positions to selectively connect said conduit only to a heat exchanger in the primary circuit in the first position, and to a separate heat exchanger in both the primary and secondary heating circuits in the second position.

6. The heating system of claim 5 wherein the heat exchanger (76) in the primary heating circuit and the heat exchanger (70) in the secondary heating circuit each open to a separate outlet conduit (84-86), each of which forms a part of the primary and secondary heating circuits respectively, and conduit means (88) interconnecting said outlet conduits together.

7. The system of claim 6 wherein valve means (90) is positioned in said conduit means (88) and movable between controlling positions to selectively interconnect and isolate said primary and secondary heating circuits (65-66).

8. The heating system defined by claim 1 wherein said primary and secondary heating circuits are isolated from each other with respect to engine coolant fluid circulation, but said primary and secondary circuits are in successive heat exchange relationship with respect to the air to be delivered to said passenger compartment.

9. The system of claim 1 wherein an expansion conduit (107) interconnects the primary and secondary heating circuits.

10. The system of claim 8 wherein the heat exchanger in each of the primary and secondary heating circuits are aligned side-by-side against each other.

11. The system of claim 8 wherein the heat exchanger in each of the primary and secondary heating circuits are aligned side-by-side in spaced relation to each other.

12. The system of claim 1 wherein the primary heating circuit includes an integral expansion vessel.

13. The system of claim 1 wherein the primary heating circuit includes a circulation pump for the coolant fluid contained therein.

* * * * *